April 20, 1937. G. L. R. J. MESSIER 2,077,526

SYSTEM FOR RESILIENTLY CONNECTING FLOATS TO SEAPLANE BAYS

Filed May 6, 1936 2 Sheets-Sheet 1

INVENTOR:
George Louis René Jean Messier, Deceased
By: Yvonne Lucie Messier Born Bonnamy, Administratrix
By: Marks & Clerk Attys April 20, 1937.　　　G. L. R. J. MESSIER　　　2,077,526
SYSTEM FOR RESILIENTLY CONNECTING FLOATS TO SEAPLANE BAYS
Filed May 6, 1936　　　2 Sheets-Sheet 2
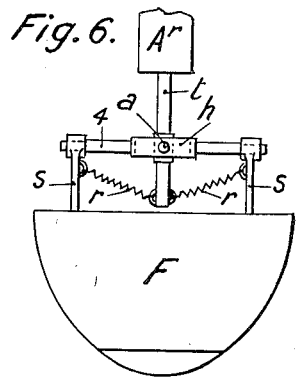
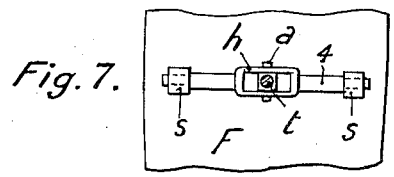
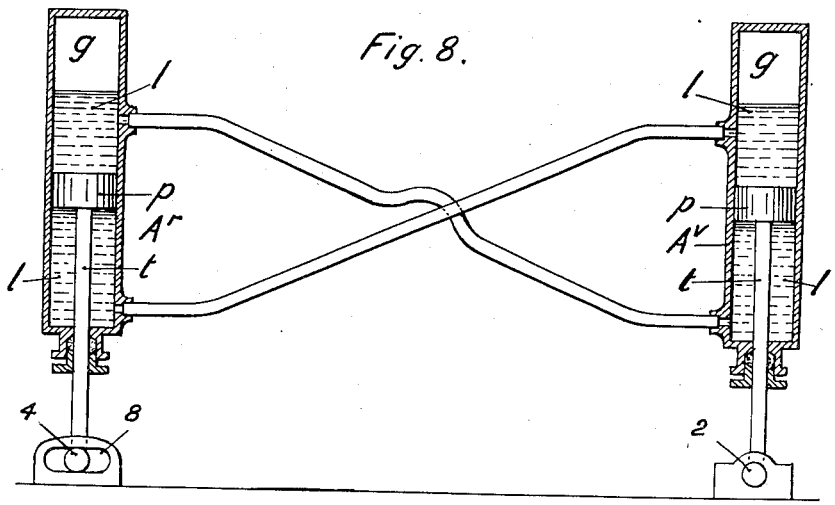
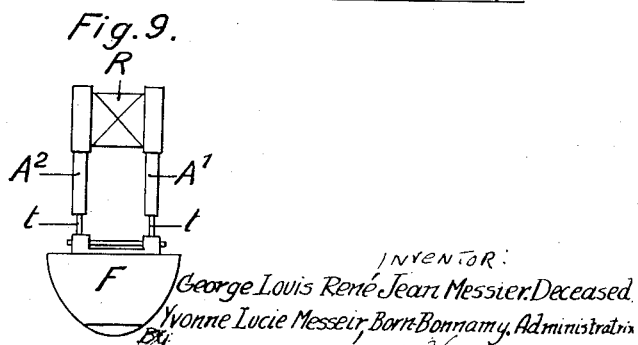
INVENTOR:
George Louis René Jean Messier, Deceased
Yvonne Lucie Messier, Born Bonnamy, Administratrix
By Marks & Clerk
Attys Patented Apr. 20, 1937

2,077,526

UNITED STATES PATENT OFFICE 2,077,526

SYSTEM FOR RESILIENTLY CONNECTING FLOATS TO SEAPLANE BAYS

George Louis René Jean Messier, deceased, late of Paris, France, by Yvonne Lucie Messier, born Bonnamy, administratrix, Paris, France Application May 6, 1933, Serial No. 669,772
In France May 14, 1932

4 Claims. (Cl. 244—105)

This invention has for its object a system for connecting the floats of a seaplane and the body such as the fuselage or wing of the latter, this system being combined in such a manner as to deaden the shocks of the float against the liquid surface, upon alighting on water.

Various forms of construction of these resilient connecting systems, according to the invention, are illustrated in the accompanying drawings.

Fig. 6 is a fragmentary rear elevational detail of a modified form of a connection, Fig. 7 is a fragmentary plan view of the arrangement shown in Fig. 6, a part being shown in section, Fig. 8 is a vertical longitudinal sectional view of a further modification of the resilient connection, and Fig. 9 is an end elevational detail of still another form of the invention.

In all the figures, F designates the float or floats, R the fuselage and L the wing.

$A^v$ and $A^r$ respectively designate the shock absorber (or the group of shock absorbers) located at the front and the shock absorber (or the group of shock absorbers) located at the rear.

Figure 1:
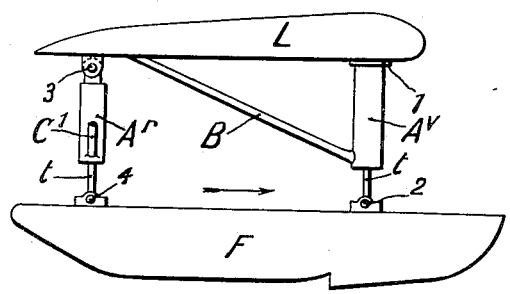
Fig. 1 is a side elevation of one form of the invention.

Referring to Fig. 1, it will be seen that the rod $t$ of each shock absorber is pivoted on the float by means of spindles 2 and 4, respectively. The body of the shock absorber is connected to the body of the seaplane for instance the wing L.

One of the two shock absorbers, for instance the front shock absorber $A^v$ is rigidly connected to the seaplane, at 1, and it is preferably braced by longitudinal bars B and by side bars in order to prevent backward movement of the float.

Figure 2:
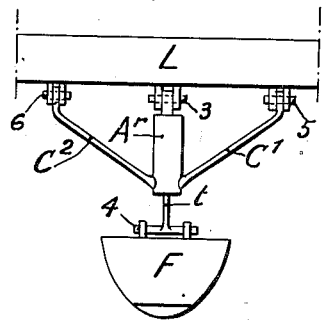
Fig. 2 is an end elevational detail thereof.

The other shock absorber $A^r$, in the example shown, is connected to the seaplane by a joint, the pin 3 of which is at right angles to the longitudinal axis of the float. This shock absorber may also be braced by side bars $C^1$, $C^2$, as illustrated in Fig. 2, which shows a rear view of the system. These bars $C^1$, $C^2$ are also pivoted, at 5 and 6, to the body of the seaplane.

Owing to these arrangements, vertical shocks to which the float may be subjected are thus deadened.

Figure 3:
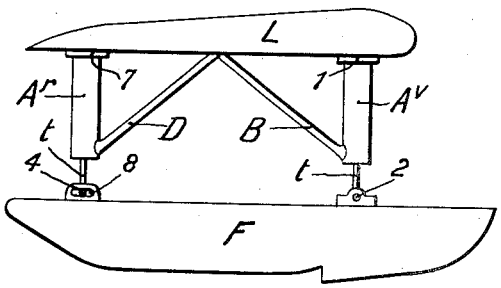
Fig. 3 is a side elevational view of another form of the invention.

A constructional modification, illustrated in Fig. 3, consists in bracing also the rear shock absorber $A^r$ at the front, by means of a bar D. In this case, the joint 3 is dispensed with, the shock absorber body being rigidly connected, at 7, to the body of the seaplane. On the other hand, the joint 4 has sufficient play, obtained for instance by means of a groove 8, in order that the pitching inclinations of the float may freely take place. This arrangement is particularly applicable in case it is desired to use the shock absorbers for supporting a system of bracing wires.

It is also necessary to deaden the shocks which occur between waves and the front of the floats and which, consequently, tend to push the latter backwards.

Figure 4:
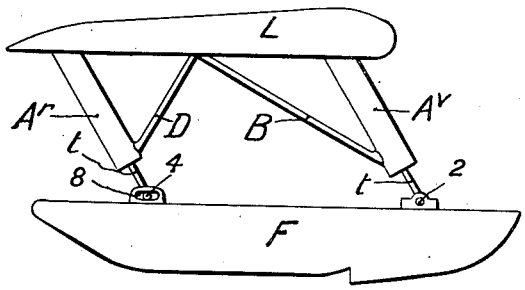
Fig. 4 is a side elevational view of still another form.

For that purpose, as shown in Fig. 4, and according to the invention, the shock absorbers will be inclined to a suitable extent relatively to the vertical.

Figure 5:
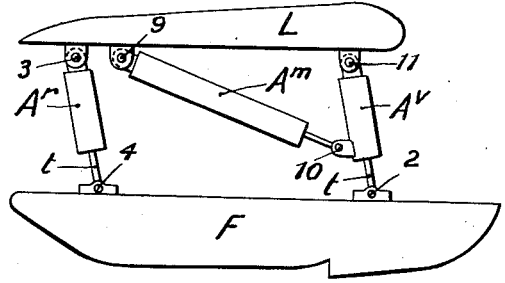
Fig. 5 is a side elevational view of a further modification.

According to the modification shown in Fig. 5, it is also possible to replace the longitudinal bracing bar or bars B by a third shock absorber $A^m$ pivoted on the seaplane body at 9 and on the front shock absorber at 10. In this case, the shock absorber preventing backward movement of the float (the shock absorber $A^v$ in the example shown), is pivoted on the seaplane body, at 11, instead of being rigidly secured to the latter.

The arrangements which have just been described deaden shocks directed vertically or directed from the front to the rear.

In order to deaden stresses due to the shock of water on the side walls of the floats, the latter may be allowed a slight rolling movement, by interposing a suitable resilient connection between the piston rods of the front and rear shock absorbers and the floats. Figs. 6 and 7 illustrate an example of such a device.

The transverse pivot shaft 4 of the float is provided with a fork piece $h$ to which is pivoted, through a longitudinal pin $a$, the rod $t$ of the shock absorber. Springs $r$—$r$ secured, on the one hand, to the lower end of this rod and, on the other hand, to the supports of the piston shaft 4, tend to constantly restore the float to its position of equilibrium, thus deadening lateral shocks.

It may be convenient to provide shock absorbers having a relatively long stroke. In this case, however, the floats may for instance nose-dive or cabre to an excessive extent. For preventing this action from taking place, use may be made of the coupling device illustrated in Fig. 8. Both shock absorbers $A^v$ and $A^r$ are of the so-called "flooded piston" type, a liquid layer $l$ existing on either side of these pistons, in the cylinders. The upper liquid layers are surmounted by an air or compressed gas layer $g$. Diagonal communications are provided between each of the lower liquid layers and upper liquid layers in the opposite cylinder.

Owing to the fact that the presence of the piston rods $t$ reduces, on the lower faces of the pistons, the useful section on which the pressure is exerted, it is easy to see that checking of the relative displacements of the float or floats and of the seaplane body is much more powerful when the pistons $p$ move in reverse directions than when these members move in the same direction. The resiliency of the system is much greater for parallel movements, in the same direction, of both pistons than for the movements in opposite directions, and this particularity prevents, to a sufficient extent, the diving or rising movements of the floats tending to take place.

As indicated in the preamble, the various connections above described may be effected either by means of a single shock absorber, or by combined shock absorbers $A^1$, $A^2$ (Fig. 9), this arrangement being provided, if need be, at the front and at the rear of the fuselage R of the seaplane.

For varying at will the inclination of the floats relatively to the seaplane, it is possible either to modify the value of the pressure in either of the shock absorbers $A^v$ and $A^r$, or to introduce a compressed fluid at a greater or less pressure, under either of the pistons of the shock absorbers.

By utilization of these various arrangements and by combining them according to circumstances, a resilient connection is provided between the body of a seaplane and its floats, owing to which connection the pitching and rolling movements are deadened as well as backward shocks tending to move the float or floats away from the normal position of equilibrium. Moreover, these resilient systems are of such construction that the floats are constantly maintained or restored in the vertical plane parallel to the longitudinal axis of the seaplane so that the "hugging" phenomena which might be prejudicious to steering and stability, or which might check the advance of the seaplane, are avoided.

What is claimed as the invention and desired to be secured by Letters Patent is:

1. In a resilient connecting system of the type described, a shock absorber including a movable element, a float, a transverse pivot shaft for the float, supports for this transverse shaft, a fork piece, on this shaft, a longitudinal pivot pin on this fork piece, a joint connecting this longitudinal pivot pin and the movable element of the shock absorber connecting the float to the body of the seaplane, springs attached, on the one hand, to this movable element and, on the other hand, to the supports of the transverse pivot shaft.

2. A resilient connecting means between a seaplane and a float, comprising exclusively for each connecting unit one pair of resilient shock absorbers mounted tandemwise, one in front and the other behind, and such means that the quadrilateral, which is formed by said pair of shock absorbers in tandem, said float and the body of the sea-plane, has two constant sides and one constant angle.

3. A resilient connecting means between a seaplane and a float, comprising exclusively for each connecting unit one pair of resilient shock absorbers mounted tandemwise, one in front and the other behind, and such means that the quadrilateral, which is formed by said pair of shock absorbers in tandem, said float and the body of the sea-plane, has two constant angles and one constant side.

4. A resilient connecting means between a seaplane and a float, comprising exclusively for each connecting unit one pair of resilient shock absorbers mounted tandemwise, one in front and the other behind and means such as the quadrilateral formed by the pair of shock absorbers, the said float and the body of the sea-plane possessing three constant constituent elements.

YVONNE LUCIE MESSIER,
BORN BONNAMY,
*Administratrix of the Estate of George Louis René Jean Messier, Deceased.*